(12) United States Patent
Ben-Zur et al.

(10) Patent No.: US 11,712,895 B2
(45) Date of Patent: *Aug. 1, 2023

(54) MODULAR PRINTING APPARATUS AND METHOD

(71) Applicant: Kornit Digital Ltd., Rosh HaAyin (IL)

(72) Inventors: Ofer Ben-Zur, Hod-HaSharon (IL); Alon Feldman, Kibbutz Kfar-Menachem (IL); Ohad Snir, Kiryat-Ono (IL)

(73) Assignee: Kornit Digital Ltd., Rosh HaAyin (IL)

( * ) Notice: Subject to any disclaimer, the term of this patent is extended or adjusted under 35 U.S.C. 154(b) by 323 days.

This patent is subject to a terminal disclaimer.

(21) Appl. No.: 17/087,690

(22) Filed: Nov. 3, 2020

(65) Prior Publication Data

US 2021/0046755 A1    Feb. 18, 2021

Related U.S. Application Data

(63) Continuation of application No. 16/724,425, filed on Dec. 23, 2019, now Pat. No. 10,906,312, which is a
(Continued)

(51) Int. Cl.
*B41J 29/02* (2006.01)
*B41J 3/407* (2006.01)
(Continued)

(52) U.S. Cl.
CPC ............. *B41J 2/145* (2013.01); *B41J 3/4078* (2013.01); *B41J 3/543* (2013.01); *B41J 11/06* (2013.01);
(Continued)

(58) Field of Classification Search
CPC . B41J 2/145; B41J 3/4078; B41J 3/543; B41J 11/06; B41J 29/02; B41J 2/01; B60H 1/00542
See application file for complete search history.

(56) References Cited

U.S. PATENT DOCUMENTS 4,841,306 A    6/1989    Archer et al.
4,947,978 A    8/1990    Rhodes
(Continued)

FOREIGN PATENT DOCUMENTS

CN    101376300    3/2009
CN    102656237    9/2012
(Continued)

OTHER PUBLICATIONS

Communication Pursuant to Article 94(3) EPC dated Feb. 12, 2021 From the European Patent Office Re. Application No. 16863781.7. (6 Pages).

(Continued)

*Primary Examiner* — Yaovi M Ameh

(57) ABSTRACT

A modular textile printing apparatus is made up of multiple modules which are combined together. Each module has one rail for bearing a printing functional unit such as a print head. A second rail perpendicular to the first rail faces the first rail, and carries a printing tray or platen holding items to be printed. The tray moves along the rail. A third rail parallel to said second rail and facing away from the printing functional unit, is also for carrying the tray. The modules are connected together and the apparatus provides a starting point for loading and unloading the trays. The second rails are aligned with each other to form a continuous printing feed along the modules and the third rails are aligned to provide a return path after printing to the starting point for reloading.

17 Claims, 6 Drawing Sheets

Related U.S. Application Data continuation of application No. 15/775,013, filed as application No. PCT/IL2016/051210 on Nov. 9, 2016, now Pat. No. 10,543,686.

(60) Provisional application No. 62/253,203, filed on Nov. 10, 2015.

(51) Int. Cl.
| | | |
|---|---|---|
| *B41J 2/145* | (2006.01) | |
| *B60H 1/00* | (2006.01) | |
| *B41J 3/54* | (2006.01) | |
| *B41J 11/06* | (2006.01) | |
| *B41J 2/01* | (2006.01) | |

(52) U.S. Cl.
CPC .......... *B41J 29/02* (2013.01); *B60H 1/00542* (2013.01); *B41J 2/01* (2013.01)

(56) References Cited

U.S. PATENT DOCUMENTS

| | | | | |
|---|---|---|---|---|
| 5,456,172 | A | | 10/1995 | Herrmann |
| 5,887,519 | A | * | 3/1999 | Zelko ................. B41F 15/0863 101/115 |
| 6,089,149 | A | | 7/2000 | Zelko |
| 8,292,395 | B2 | | 10/2012 | Ben-Zur et al. |
| 8,413,577 | B2 | * | 4/2013 | Doyle ................. H05K 13/0061 198/369.1 |
| 9,114,645 | B2 | | 8/2015 | Gerber |
| 10,906,312 | B2 | * | 2/2021 | Ben-Zur ............ B60H 1/00542 |
| 2004/0065220 | A1 | | 4/2004 | Lan |
| 2009/0056567 | A1 | * | 3/2009 | Ando .................... B41J 3/4078 101/34 |
| 2011/0032300 | A1 | * | 2/2011 | Ben-Zur .............. C09D 11/322 347/102 |
| 2018/0339510 | A1 | | 11/2018 | Ben-Zur et al. |
| 2020/0122463 | A1 | | 4/2020 | Ben-Zur et al. |

FOREIGN PATENT DOCUMENTS

| | | |
|---|---|---|
| CN | 104755350 | 7/2015 |
| WO | WO 2017/081682 | 5/2017 |

OTHER PUBLICATIONS

International Preliminary Report on Patentability dated May 31, 2018 From the International Bureau of WIPO Re. Application No. PCT/IL2016/051210.
International Search Report and the Written Opinion dated Feb. 20, 2017 From the International Searching Authority Re. Application No. PCT/TL2016/051210.
Notice Of Allowance dated Sep. 17, 2019 From the US Patent and Trademark Office Re. U.S. Appl. No. 15/775,013. (13 pages).
Notice of Allowance dated Oct. 20, 2020 From the US Patent and Trademark Office Re. U.S. Appl. No. 16/724,425. (12 Pages).
Notification of Office Action and Search Report dated Jul. 4, 2019 From the National Intellectual Property Administration of the People's Republic of China Re. Application No. 201680078406.9 and Its Translation Into English. (15 Pages).
Notification of Office Action dated Jun. 1, 2020 From the National Intellectual Property Administration of the People's Republic of China Re. Application No. 201680078406.9 and Its Summary in English. (10 Pages).
Official Action dated Apr. 2, 2020 From the US Patent and Trademark Office Re. U.S. Appl. No. 16/724,425. (16 Pages).
Official Action dated May 15, 2019 From the US Patent and Trademark Office Re. U.S. Appl. No. 15/775,013. (21 pages).
Supplementary European Search Report and the European Search Opinion dated Jun. 11, 2019 From the European Patent Office Re. Application No. 16863781.7. (8 Pages).
Communication Pursuant to Article 94(3) EPC dated Sep. 29, 2021 From the Euoropean Patent Office Re. Application No. 16863781.7. (4 Pages).

\* cited by examiner

MODULAR PRINTING APPARATUS AND METHOD

RELATED APPLICATIONS

This application is a continuation of U.S. patent application Ser. No. 16/724,425 filed on Dec. 23, 2019 is continuation of U.S. patent application Ser. No. 15/775,013 filed on May 10, 2018, which is a National Phase of PCT Patent Application No. PCT/IL2016/051210 having International Filing Date of Nov. 9, 2016, which claims the benefit of priority under 35 USC § 119(e) of U.S. Provisional Patent Application No. 62/253,203 filed on Nov. 10, 2015. The contents of the above applications are all incorporated by reference as if fully set forth herein in their entirety.

FIELD AND BACKGROUND OF THE INVENTION

The present invention, in some embodiments thereof, relates to a modular printing apparatus and method and, more particularly, but not exclusively, to a modular printing apparatus and method where separate modules carry out individual printing functions and the modules are assembled at the printing locations to carry out specified printing operations.

Digital printing employs a functional unit having several ink injectors, each injector applying one color. A controller moves the functional unit over the printed sheet (or the printed sheet under the functional unit) and instructs the ink injectors when to inject ink. To speed up the printing process, a digital printing system may employ several functional units concurrently, and a functional unit may have hundreds of injectors of the same color.

Digital printing creates images of higher spatial resolution, and higher color resolution i.e. many more shades of each color. The result is an image of relatively high quality. Digital printing requires very short preparation prior to printing however the printing itself is slow and inefficient relative to the alternate system of screen printing. Printing often involves an additional stage of curing, where the ink is dried. Thus far digital printing on paper and fabrics are the same. However printing on fabrics often involve additional stages such as a wetting process which may be required shortly before, during or just after application of the ink to prevent bleeding of the ink into the fabric. Specific processes distinctive of fabric printing such as ironing to provide a flat surface or as a way of curing may be also required.

Different factories may be involved in different printing processes and it is inefficient to design different machines for each factory. U.S. Pat. No. 8,292,395 issued 23 Oct. 2012 details a matrix construction in which modular units are provided by the manufacturer and constructed on site according to the requirements of the factory. The matrix requires each module to be fully aligned with as many as four neighboring modules, and use over the years has shown that difficulties arise where factory floors are not sufficiently flat over the large area that the matrix requires. Also a large amount of space is required at either end of the matrix, one for a loading area and one for an unloading area. Use over the years has shown that not all factory settings have such space available.

SUMMARY OF THE INVENTION

The present embodiments address the above shortcomings. A sequence of modules are joined together to provide a linear printing path where motion of a series of printing trays or pallets and different printing functional units is coordinated together.

Alignment of the modules as a whole does not have to be exact as long as the rail on which the printing trays travel is accurately aligned, and this may be achieved by using adjustable level settings for the rail at the edges of each module to align the rail with that of the neighboring module.

Furthermore a single loading and unloading area can be achieved by giving the trays a return path through the modules back to a single start area.

According to an aspect of some embodiments of the present invention there is provided a modular apparatus for printing comprising:

a plurality of modules connectable together, each module having a printing functional unit and a track for a printing tray, the tracks being connectable together between modules to form a printing path; and a controller connectable to each module individually to control motion of a plurality of printing trays along the printing path and coordination the motion of the plurality of printing trays with operation of each of the printing functional units.

In an embodiment, the modules and respective corresponding functional units are arranged in series to perform a series of printing functions on the items to be printed.

In an embodiment, one of the printing functional units comprises a plurality of inkjet nozzles for performing digital printing, and in a further embodiment, the inkjet nozzles comprise drop-on-demand piezoelectric inkjet nozzles or continuous piezoelectric inkjet nozzles.

In an embodiment, one of the printing functional units comprises one member of the group consisting of an array of sprayers, a curing unit for curing ink on the item to be printed, an infrared curing unit, a hot air blowing curing unit, a microwave curing unit, an ironing unit for ironing the item to be printed, a stencil printing unit, an array of valve jet nozzles for performing digital printing, and a heat press.

In an embodiment, the printing path comprises a track, the track being supported by adjustable supports at respective first and second sides of a corresponding module to enable adjustment of levels of the track at the respective sides to align the track levelwise with a corresponding track of an adjacent module.

An embodiment may comprise a second track connectable to form a return path to return the printing trays to a start point.

In an embodiment, the second track is supported by adjustable supports at respective first and second sides of a corresponding module to enable adjustment of a level of the second track at the respective sides to align the second track levelwise with a corresponding track of an adjacent module to form the return path.

An embodiment may comprise end point modules, each end point module having an elevator for transferring a printing tray between the printing path and the return path. The forward and return paths and elevator sections may operate using an endless belt.

According to a second aspect of the present invention there is provided modular textile printing apparatus, comprising:

a plurality of modules combinable together; each module comprising:

a. a first rail for bearing a printing functional unit;

b. a second rail perpendicular to the first rail and facing the first rail, configured to bear a printing tray holding items to be printed and to provide for mobility of the trays along the second rail; and c. a third rail parallel to the second rail and facing away from the printing functional unit, the third rail also configured to bear the printing tray and to provide for mobility of the trays along the third rail;

wherein the modules are connected together to:

provide a starting point;

to align respective second rails to form a continuous printing feed to allow the printing tray to be controllably mobile along successive ones of the modules to bring the items in proximity with respective functional units along the successive modules; and to align the third rails to provide a continuous return feed to allow the printing tray to be controllably mobile along the successive modules to return to the starting point.

In an embodiment, the modules and respective corresponding functional units are arranged in series to perform a series of printing functions on the items to be printed.

In an embodiment, operation of the continuous printing feed is coordinated with the functional units to allow the functional units to approach a given printing tray in a defined sequence for performing a respective printing process.

In an embodiment, printing tray travel is linear and/or printing functional unit travel is linear.

In an embodiment, the rails are placed within a surrounding frame to define boundaries of each module.

A motion controller may be connected to each module to coordinate motion between printing functional units and printing trays over the modules to ensure that printing trays are subjected to predetermined sequences of printing operations from the functional units.

In an embodiment, one of the printing functional units comprises a plurality of inkjet nozzles for performing digital printing, wherein the inkjet nozzles further comprise drop-on-demand piezoelectric inkjet nozzles or continuous piezoelectric inkjet nozzles.

In an embodiment, the third rail is supported by adjustable supports at respective first and second sides of a corresponding module to enable adjustment of a level of the third rail at the respective sides to align the third rail levelwise with a corresponding third rail of an adjacent module.

In an embodiment, the start point is located at a meeting point between one of the elevators and the second rail.

In an embodiment, the item to be printed is one member of the group consisting of a textile, a felt and a garment.

According to a third aspect of the present invention there is provided a modular system for printing, comprising: a plurality of printing modules, each module comprising a first rail for bearing a printing functional unit, a second rail facing the first rail for bearing a printing tray for holding an item to be printed, a third rail aligned with the second rail and facing away from the first rail, and at least one tray, the tray being mobile along the second rail and the third rail to bring the item in proximity with the functional unit to be printed and then back to a starting position, each module being placed alongside other modules to align the second and the third rails to form a serial printing path and a return path to a starting position.

According to a fourth aspect of the present invention there is provided a method for building a modular apparatus for printing; comprising:

a. providing a plurality of modules, each module comprising a first rail for bearing a printing functional unit, a second rail facing the first rail for bearing a printing tray for holding an item to be printed, the tray being mobile along the second rail to bring the item to be printed in proximity with the functional unit, and a third rail aligned with the second rail and facing away from the first rail; and b. connecting the modules together by respective second and third rails, thereby to provide continuity of travel for the printing trays from a printing start position via the functional units and back to the start position.

The method may include adding and/or removing one or more of the printing modules thereby to adapt the apparatus for a different sequence of printing.

According to a fifth aspect of the present invention there is provided a modular textile printing apparatus, comprising:

a plurality of modules combinable together; each module comprising:

a. a first rail for bearing a printing functional unit; and b. a second rail perpendicular to the first rail and facing the first rail, configured to bear a printing tray holding items to be printed and to provide for mobility of the trays along the second rail; and wherein the modules are connected together to:

provide a starting point;

to align respective second rails to form a continuous printing feed to allow the printing tray to be controllably mobile along successive ones of the modules to bring the items in proximity with respective functional units along the successive modules;

and wherein the second rail is supported by adjustable supports at respective first and second sides of a corresponding module to enable adjustment of levels of the second rail at the respective sides to align the second rail levelwise with a corresponding second rail of an adjacent module.

According to a sixth aspect of the present invention there is provided a method for building a modular apparatus for printing comprising:

a. providing a plurality of modules, each module comprising a first rail for bearing a printing functional unit, and a second rail facing the first rail for bearing a printing tray for holding an item to be printed, the tray being mobile along the second rail to bring the item to be printed in proximity with the functional unit, the second rail having adjustable supports at either side of the module; and b. connecting the modules together by respective second rails, the connecting comprising adjusting the adjustable supports to align respective second rails levelwise, thereby to provide continuity of travel for the printing trays from a printing start position via the functional units along the modules.

According to a seventh aspect of the present invention there is provided a modular apparatus for printing comprising:

a plurality of modules connectable together, each module having a printing functional unit and a track for a printing tray, the tracks being connectable together between modules to form a printing path; and a controller connectable to each module individually to control motion of a plurality of printing trays along the printing path and coordination the motion of the plurality of printing trays with operation of each of the printing functional units.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
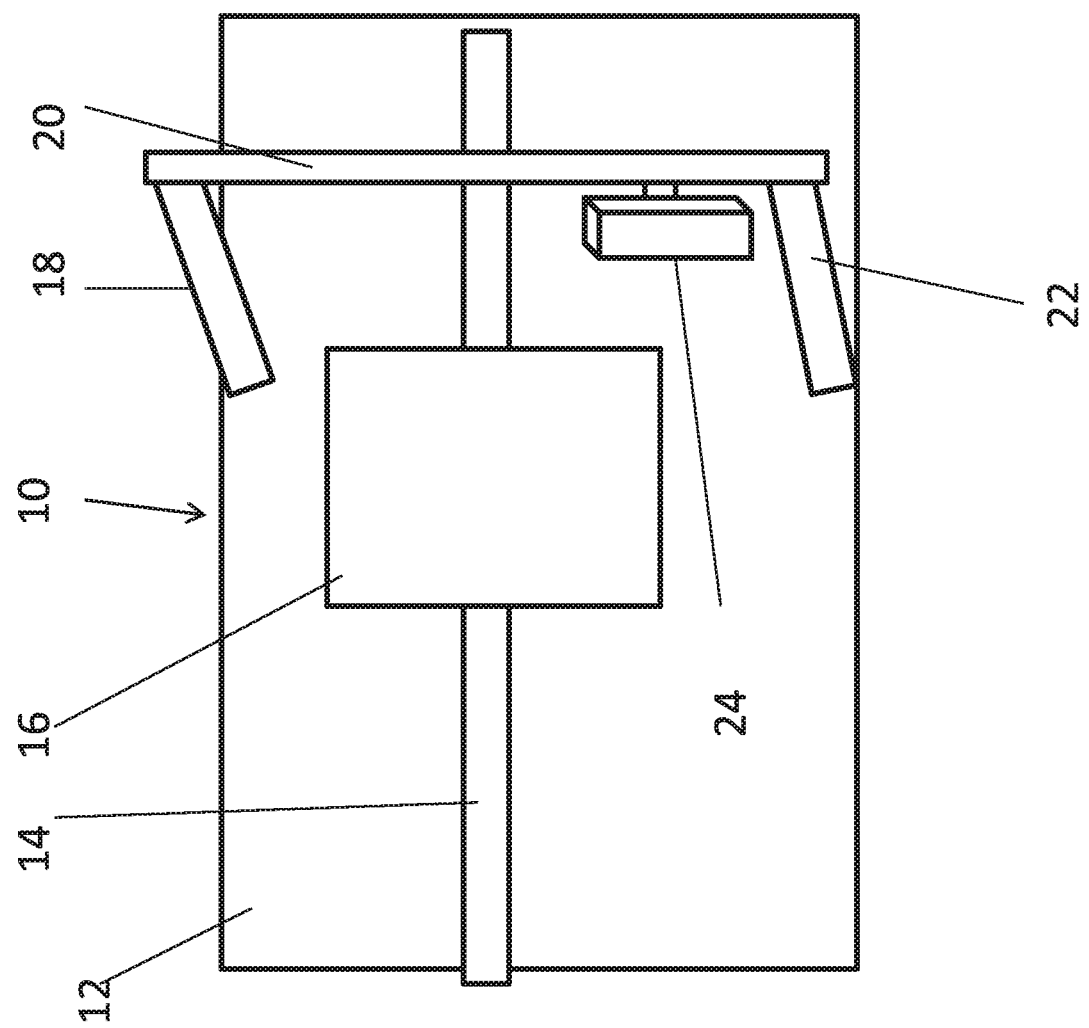
FIG. 1 is a simplified diagram showing a schematic view from above of a module for use in fabric printing according to the present embodiments.

The present invention, in some embodiments thereof, relates to a modular printing apparatus and method and, more particularly, but not exclusively, to a modular printing apparatus and method where separate modules carry out individual printing functions and the modules are assembled at the printing locations, factory etc. to carry out specified printing operations.

A modular textile printing apparatus is made up of multiple modules which are combined together. Each module has one rail for bearing a printing functional unit such as a print head. A second rail in a perpendicular direction faces the first rail, and carries a printing tray or platen holding items to be printed. The tray moves along the rail, and motion is coordinated between the printing trays and the functional units along the line of modules.

A third rail parallel to the second rail and facing away from the printing functional unit, is also for carrying the tray. As the modules are connected together, the apparatus may provide a starting point for loading and unloading the trays. The second rails are aligned with each other to form a continuous printing feed along the modules and the third rails are aligned to provide a return path after printing to the starting point for reloading.

Thus particular embodiments may be distinguished by one or more of the following features: coordinated motion of the pallets or printing trays and the printing functional units, a single loading and unloading point to which the platen or tray always returns, a return rail facing away from the printing functional units, for carrying the trays back to the starting point after printing, and an adjustment mechanism for allowing the tray-bearing rails to be aligned at the edge of each module with the rail of the neighboring module. The latter feature enables the modules to be set up together and aligned even at locations with uneven floors.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified schematic diagram illustrating a view from above of a printing module 10 that can be combined at either end with other modules to form a multi-function textile printing apparatus. The module comprises a table or housing 12, and a rail 14 that carries a tray or platen 16 on which is placed an object to be printed. The tray or platen arrives from a previous module or from the start position in the case of the first module, traverses the module along the rail and then exits to the next module or is transferred to a return rail in the case of the final module. The rail 14 is connected to rails of adjacent modules, as will be discussed in greater detail below.

An additional rail 18 is raised by supports 20 and 22 above the surface of the module. Printing functional unit 24 rides on rail 20 and traverses the path of the platen 16. The printing functional unit may carry out any printing related process including spraying printing ink, spraying printing ink of a particular color, wetting the fabric, or curing the fabric.

Figure 2:
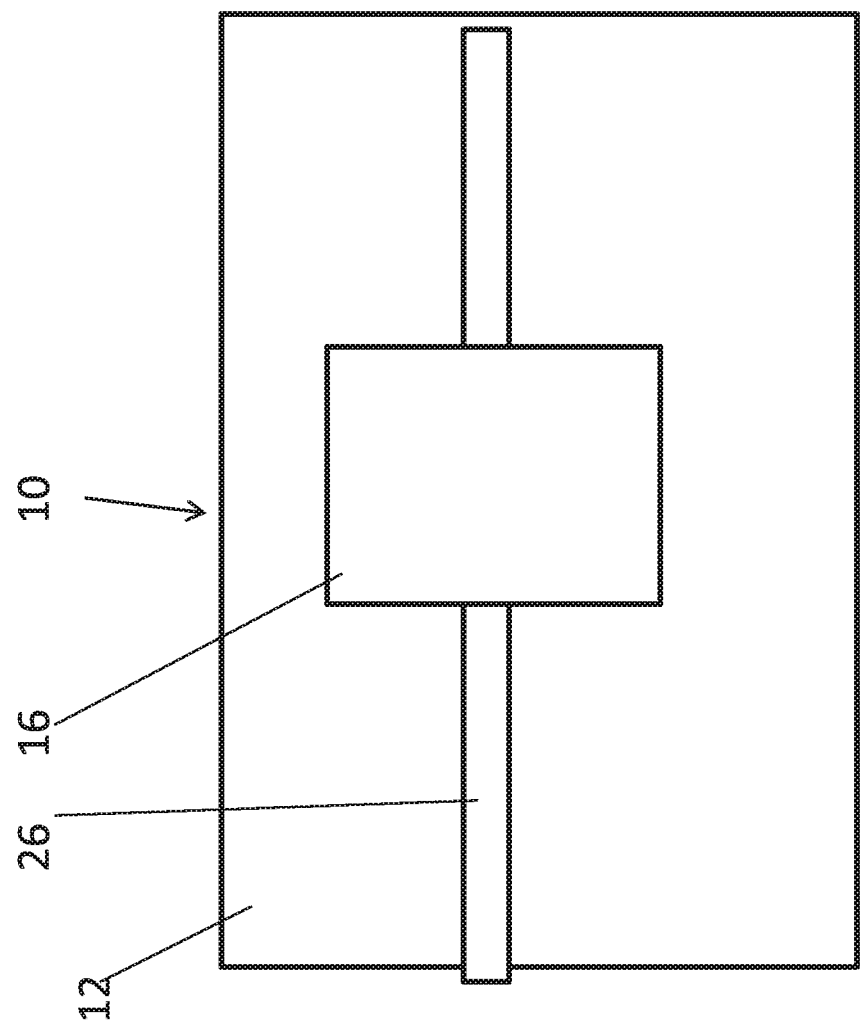
FIG. 2 is a simplified schematic view from below of the module of FIG. 1.

Reference is now made to FIG. 2, which is a schematic diagram which illustrates the module 10 of FIG. 1 seen from below. Body 12 of the module is traversed by return rail 26, which provides a return path for tray 16 to return tray 16 to a loading point, as will be discussed below. It is noted that it is not essential for the return rail to run underneath. The return rail may run at the side or even over the top, although in such a case, care should be taken not to get printing ink and other materials onto the fabric during the return journey.

The return rail 26 is likewise connected to any adjacent units to give a continuous run for tray 16 back to the loading point.

In an embodiment end modules provide an elevator mechanism for moving the trays vertically between the forward 14 and return 26 rails.

Figure 3:
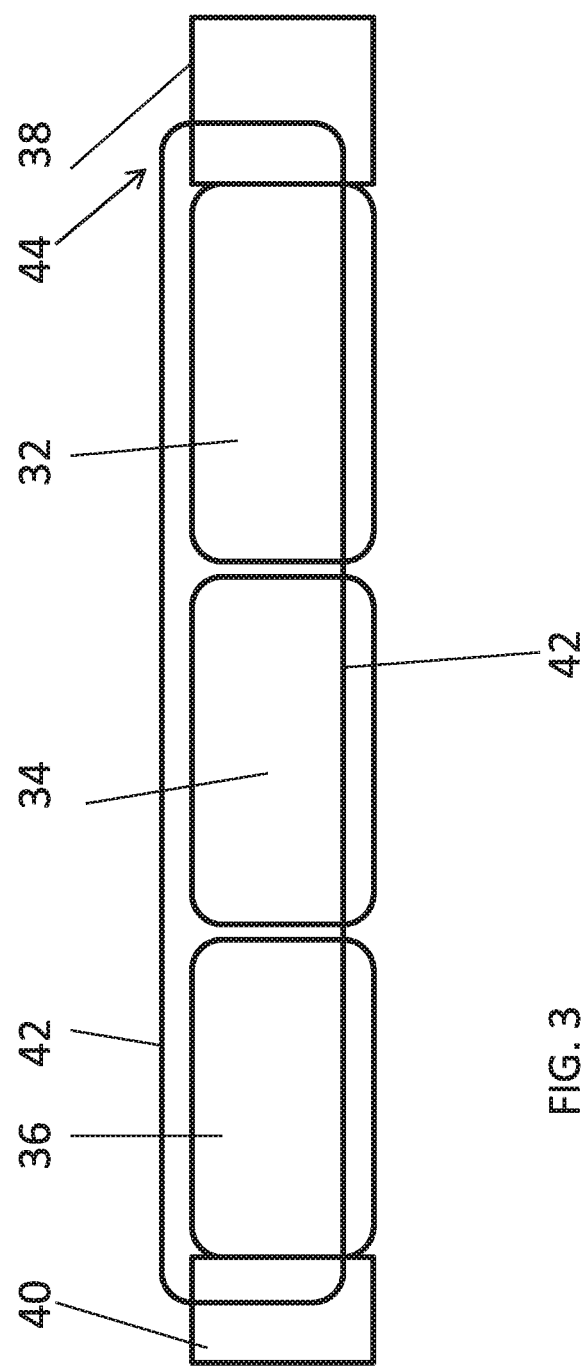
FIG. 3 is a simplified schematic view from the side of three modules connected together according to the present embodiments and particularly showing a path for the trays or platens.

Reference is now made to FIG. 3, which is a simplified diagram illustrating a schematic side view of a series of modules attached together and illustrating a path followed by the platen.

Three modules, 32, 34 and 36 are connected together. End sections 38 and 40 complete the two modules at either end. Path 42 illustrates the travel of the platen around the modules. Position 44 is ideally located at the first end piece at the point where path 42 rises from the return journey. Position 44 thus provides a loading and unloading position.

When setting up and configuring the apparatus for a particular printing process, a module may be provided for each printing operation that is required. A fast throughput printing operation may be achieved by printing each color and black and white on separate modules. A smaller factory however may not have enough room for the necessary modules and thus some of the modules may carry out more than one function. Also some factories may require simpler printing processes and/or lower throughputs.

Although the figure illustrates three modules, as will be appreciated, any number of modules may be provided as required by the desired throughput rate and complexity of the process and the space available within the factory.

Figure 4:
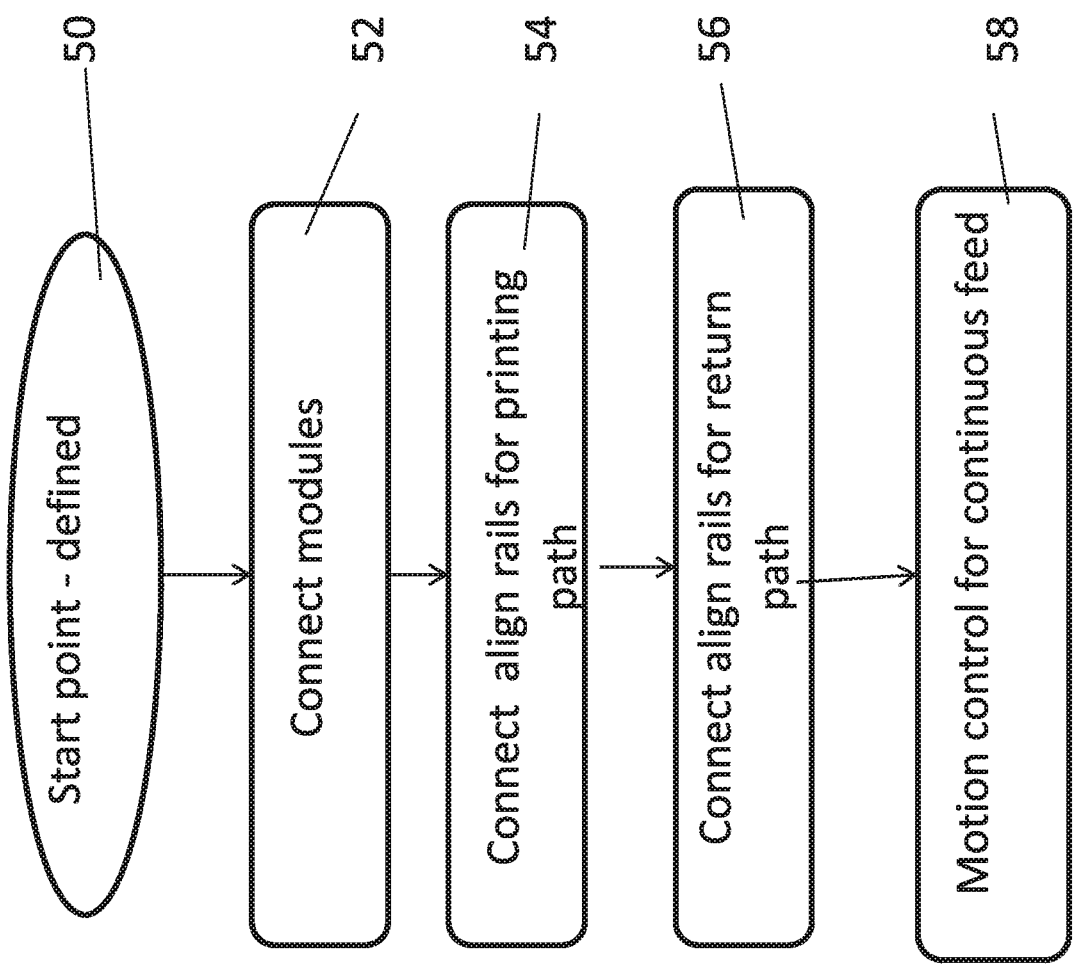
FIG. 4 is a flow chart showing stages in setting up the printing apparatus from the individual modules in a factory setting according to embodiments of the present invention.

Reference is now made to FIG. 4, which is a simplified flow chart illustrating a process of setting up the modules of FIG. 3 to provide a printing assembly. A starting point is defined 50 where loading and unloading can be carried out. The starting point requires space for an operator to carry out the loading and unloading operations for the fabrics to be printed.

The modules are connected together 52. The upper rails are connected together 54 to form a continuous printing feed to allow the printing tray to be controllably mobile along the modules to bring the fabric items in proximity with the different printing functional units along the successive modules. The connecting together may involve alignment of the rails, particularly if the factory floor is not completely flat. The adjustment may involve vertical or horizontal alignment of the rails or a combination of both vertical and horizontal alignment. Manually operated rotatable screw alignments are one option, and electrically actuated alignments are another option.

The return rails are also connected together and may likewise require alignment 56. This is so because it is not the modules that are aligned but the rails themselves. Thus if the top rail is aligned then that does not mean that the bottom rail has been aligned, and there is no guarantee that the alignments needed for the separate rails will be the same. For example, if one of the modules is at a slight angle to the other due to a non-level floor, the lower rail, being closer to the floor, will require less adjustment than the upper rail.

A motion control unit may then be connected 58 to each of the modules to provide a continuous return feed to allow each printing tray to be controllably mobile along the successive modules to return to the starting point.

The number of modules determines the number of printing functional units. As mentioned, for high throughput a configuration is used in which there is one functional unit per printing operation. Where there are constraints of cost or space, throughput can be sacrificed by allowing functional units to carry out more than one printing function. The number of printing trays or platens is typically the same as or larger than the number of functional units, so that for high throughput, there may be one platen at each functional unit, one being loaded and one or more on the return journey.

As shown in FIG. 3, the modules and corresponding functional units are arranged in series to perform the required series of printing functions.

As explained, the motion control ensures that the functional units move in coordination with the platens in order to carry out printing.

Typically, printing tray travel is linear around the printing track, and the printing functional unit travel is linear along the printing unit rail at right angles to the platen.

The printing functional units are typically inkjet print heads. That is they include multiple inkjet nozzles for performing digital printing. The inkjet nozzles may be drop-on-demand piezoelectric inkjet nozzles or continuous piezoelectric inkjet nozzles. For wetting, the nozzles may spray wetting compounds rather than inks as such. Other operations such as flattening or ironing the fabrics before or after printing may also be provided by the modules and are likewise defined herein as printing operations as they provide part of the printing process. In fact the printing functional units may include arrays of sprayers, a curing unit for curing the ink, an infrared curing unit, a hot air blowing curing unit, a microwave curing unit, an ironing unit, a stencil printing unit, an array of valve jet nozzles for performing digital printing, and a heat press.

The alignment for the rails may include adjustable supports for the rail at either side of the module. The rail is raised or lowered at the particular side to align with the rail of the adjacent module. In this way the rail can be leveled independently at the two sides of the module. The same arrangement may be applied both for the forward direction rail and the return direction rail.

The fabrics to be printed may include garments and other items made of fabric, which can be positioned on the platen to be printed. In addition, cuts of fabric not formed or not yet formed into a garment or other item may be printed, and the fabric used may include woven textile or felt.

During the course of use the configuration of the printing modules may be changed according to need. Thus new modules may be added or old modules may be removed, and particular modules may be given different functions.

Figure 5:
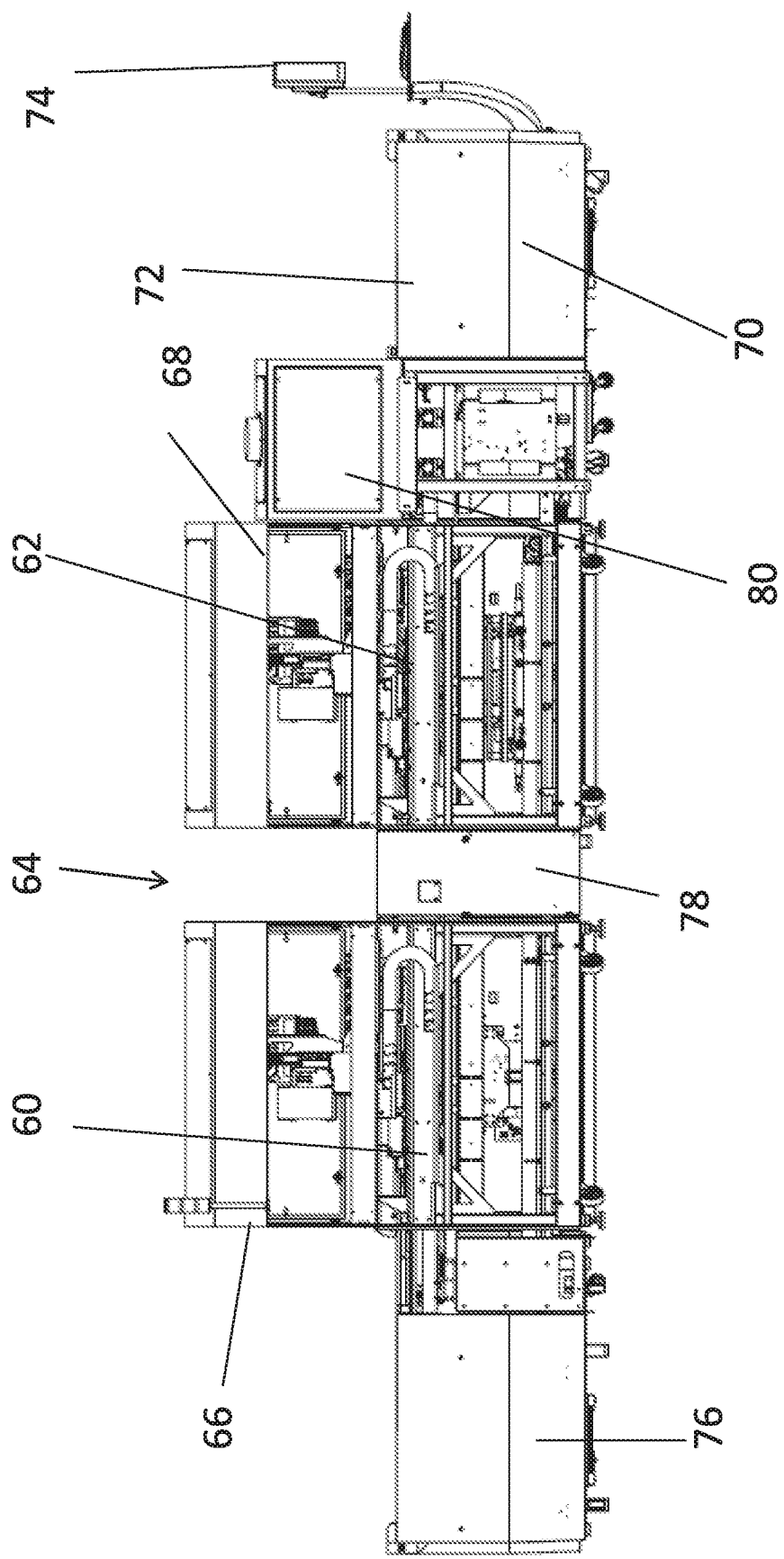
FIG. 5 is a schematic diagram showing a printing apparatus made of two modules according to an embodiment of the present invention.
Figure 6:
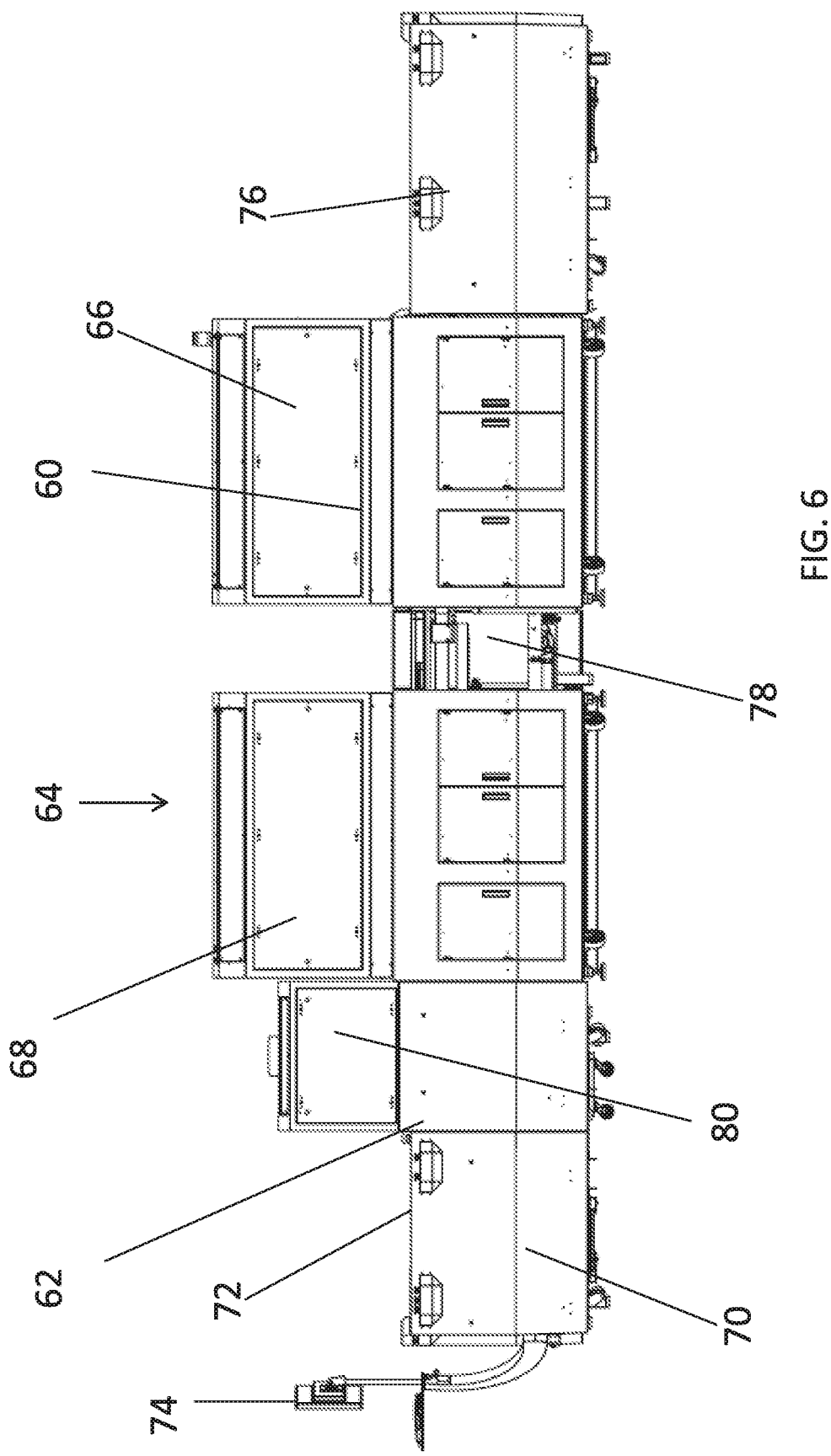
FIG. 6 is a schematic diagram of the printing apparatus of FIG. 5 viewed from the reverse side.

Reference is now made to FIGS. 5 and 6, which are simplified schematic side views of two modules 60 and 62 connected together into a printing assembly 64. FIGS. 5 and 6 show the two opposite sides of the machinery. Each module has an upper section 66, 68, which carries the printing functional unit, and the drive mechanism and the carrier rail for the printing functional unit. Below that, the body of the body of the module carries the travel rail for the platens or trays, for both the forward and reverse directions. A start section 70 includes an internal elevator part (not visible) that raises the platen from the lower return track to the upper printing track, and the point 72 to which the platen is raised forms the start or loading and unloading point.

Start stop indicator 74 indicates whether or not the machinery is on, so that personnel know to keep clear of moving parts. End section 76 may include an elevator (again not visible) that lowers the platen or tray from the printing path to the return path. Join 78 between the two modules provides for aligning of the rails either vertically or horizontally or both.

Controller cabinet 80 houses a motion controller which has connections for numerous modules. Motion of the platens or trays is controlled centrally by the motion controller to coordinate movement of the platens with operation of the functional units.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A modular closed loop apparatus for printing comprising:
   a plurality of modules connectable together, each module having a printing functional unit and a track for a printing tray, the track comprising at least one rail, the rails of neighbouring modules being connectable together between modules to form a continuous rail-based printing track; and
   a controller connected to each module individually to control motion of a plurality of printing trays on said rails along said continuous rail-based printing track from a print start position and back to said print start position, and coordination of said motion of said plurality of printing trays with operation of each of said printing functional units.

2. Apparatus according to claim 1, wherein said modules and respective corresponding functional units are arranged in series to perform a series of printing functions on said items to be printed.

3. Apparatus according to claim 1, wherein one of said printing functional units comprises a plurality of inkjet nozzles for performing digital printing, wherein said inkjet nozzles further comprise drop-on-demand piezoelectric inkjet nozzles or continuous piezoelectric inkjet nozzles.

4. Apparatus according to claim 1, wherein one of said printing functional units comprises one member of the group consisting of an array of sprayers, a curing unit for curing ink on said item to be printed, an infrared curing unit, a hot air blowing curing unit, a microwave curing unit, an ironing unit for ironing said item to be printed, a stencil printing unit, an array of valve jet nozzles for performing digital printing, and a heat press.

5. Apparatus according to claim 1, wherein respective rails are supported by adjustable supports at respective first and second sides of a corresponding module to enable adjustment of levels of said rails at said respective sides to align said track levelwise with a corresponding track of an adjacent module to form said printing track.

6. Apparatus according to claim 5, wherein a second rail of each module is connected with second rails of adjacent modules to form a return track continuous with said printing track to return said printing trays to a start point.

7. Apparatus according to claim 6, wherein said second rail of each module respectively is supported by adjustable supports at respective first and second sides of said respective module to enable adjustment of a level of said second rail at said respective sides to align said second rail levelwise with a corresponding rail of an adjacent module.

8. A modular closed loop apparatus for printing comprising:
   a plurality of modules connectable together, each module having a printing functional unit; and
   a controller connectable to each module individually to control motion of a plurality of printing trays along said printing path from a print start position and back to said print start position, and coordination of said motion of said plurality of printing trays with operation of each of said printing functional units, wherein:
   each module comprises a plurality of rails, the rails comprising:
   a first rail bearing a printing functional unit;
   a second rail, said second track being perpendicular to said first rail and facing said first rail, configured to bear said printing tray holding items to be printed and to provide for mobility of respective printing trays along said second rail; and
   a third rail parallel to said second rail, and facing away from said printing functional unit, said third rail also configured to bear said printing tray and to provide for mobility of said trays along said third rail;
   wherein said modules are connected together to:
   provide said print start position;
   to align respective second rails of different modules to form a continuous printing track to allow respective printing trays to be controllably mobile along successive ones of said modules to bring said items in proximity with respective functional units along said successive modules; and
   to align said third rails of different modules to provide a continuous return feed to allow said printing tray to be controllably mobile along said successive modules to return to said starting point; thereby to form a closed loop printing path via continuous rails from said print start position through said modules and back to said print start position.

9. Apparatus according to claim 8, wherein operation of said continuous printing feed is coordinated with said functional units to allow said functional units to approach a given printing tray in a defined sequence for performing a respective printing process.

10. Apparatus according to claim 8; wherein printing tray travel is linear and/or printing functional unit travel is linear.

11. Apparatus according to claim 8, wherein said rails are placed within a surrounding frame to define boundaries of each module.

12. Apparatus according to claim 8, further comprising a motion controller connected to each module to coordinate motion between printing functional units and printing trays over said modules to ensure that printing trays are subjected to predetermined sequences of printing operations from said functional units.

13. Apparatus according to claim 8, wherein one of said printing functional units comprises one member of the group consisting of an array of sprayers, a curing unit for curing ink on said item to be printed, an infrared curing unit, a hot air blowing curing unit, a microwave curing unit, an ironing unit for ironing said item to be printed, a stencil printing unit, an array of valve jet nozzles for performing digital printing, and a heat press.

14. Apparatus according to claim 8, wherein respective second rails are supported by adjustable supports at respective first and second sides of a corresponding module to enable adjustment of levels of said second rail at said respective sides to align said second rail levelwise with a corresponding second rail of an adjacent module.

15. Apparatus according to claim 8, wherein respective third rails are supported by adjustable supports at respective first and second sides of a corresponding module to enable adjustment of a level of said third rails at said respective sides to align said third rails levelwise with a corresponding rail track of an adjacent module.

16. A modular closed loop apparatus for printing comprising:
   a plurality of modules connectable together, each module having a printing functional unit and a track for printing trays, the track comprising at least one rail, the rails of neighbouring modules being connectable together between modules to form a continuous rail-based printing track, each module further comprising a second rail, the second rails of neighbouring modules being connected together to form a rail-based return track to return said printing trays, said printing track and said return track being connected together using a loop rail to form a continuous rail-based printing path from a loading position and back to said loading position; and
   a controller connected to each module individually to control motion of a plurality of printing trays on said rails along said continuous rail-based printing track from a print start position and back to said print start position, and coordination of said motion of said plurality of printing trays with operation of each of said printing functional units.

17. A modular closed loop apparatus for printing comprising:
   a plurality of modules connectable together, each module having a printing functional unit and a track for printing trays, the track comprising at least one rail, the rails of neighbouring modules being connectable together between modules to form a continuous rail-based printing track, each module further comprising a second rail, the second rails of neighbouring modules being connected together to form a rail-based return track to return said printing trays, said printing track and said return track being continuous with each other on a same level to form a continuous rail-based printing path from a loading position and back to said loading position; and
   a controller connected to each module individually to control motion of a plurality of printing trays on said rails along said continuous rail-based printing track from a print start position and back to said print start position, and coordination of said motion of said plurality of printing trays with operation of each of said printing functional units.

* * * * *